United States Patent
Bove

(10) Patent No.: US 9,825,319 B2
(45) Date of Patent: Nov. 21, 2017

(54) FOSSIL FUEL POWER PLANT WITH INTEGRATED CARBON SEPARATION FACILITY

(71) Applicant: General Electric Technology GmbH, Baden (CH)

(72) Inventor: Roberto Bove, Zürich (CH)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/477,387

(22) Filed: Apr. 3, 2017

(65) Prior Publication Data

US 2017/0207471 A1    Jul. 20, 2017

Related U.S. Application Data

(60) Division of application No. 14/087,507, filed on Nov. 22, 2013, now Pat. No. 9,647,285, which is a
(Continued)

(30) Foreign Application Priority Data

May 23, 2011    (GB) .................................. 1108616.2

(51) Int. Cl.
    *H01M 8/14*    (2006.01)
    *H01M 8/0612*    (2016.01)
    (Continued)

(52) U.S. Cl.
    CPC ..... *H01M 8/0631* (2013.01); *H01M 8/04022* (2013.01); *H01M 8/0618* (2013.01);
    (Continued)

(58) Field of Classification Search
    CPC ........... H01M 8/04022; H01M 8/0618; H01M 8/0675; H01M 2250/407
    See application file for complete search history.

(56) References Cited

U.S. PATENT DOCUMENTS

| 7,396,603 B2 | 7/2008 | Farooque et al. |
| 2003/0143448 A1 | 7/2003 | Keefer |

(Continued)

FOREIGN PATENT DOCUMENTS

| EP | 0418864 A2 | 3/1991 |
| EP | 1609952 A1 | 12/2005 |

(Continued)

OTHER PUBLICATIONS

Kawase et al., "Effects of NH3 and NOx on the performance of MCFCs", Journal of Power Sources, vol. No. 104, Issue No. 2, pp. 265-271, on Feb. 15, 2002.
(Continued)

*Primary Examiner* — Mark F Huff
*Assistant Examiner* — Monique Wills
(74) *Attorney, Agent, or Firm* — GE Global Patent Operation; Rita D. Vacca

(57) ABSTRACT

As integrated fossil fuel power plant and a method of operating the power plant is provided. The integrated fossil fuel power plant includes a gas turbine arrangement and a carbonate fuel cell having an anode side and a cathode side. The operating method for the integrated fossil fuel power plant includes partially expanding combustion gases in the gas turbine arrangement so that the temperature of the partially expanded combustion gases is optimized for reaction in the cathode side of the carbonate fuel cell, and feeding the partially expanded combustion gases at the optimized temperature to the cathode side of the carbonate fuel cell for reaction in the cathode side of the carbonate fuel cell.

2 Claims, 1 Drawing Sheet

Related U.S. Application Data continuation of application No. PCT/EP2012/058990, filed on May 15, 2012.

(51) Int. Cl.
  *H01M 8/0662* (2016.01)
  *H01M 8/04014* (2016.01)
(52) U.S. Cl.
  CPC ......... *H01M 8/0675* (2013.01); *H01M 8/145* (2013.01); *H01M 2008/147* (2013.01); *H01M 2250/10* (2013.01); *H01M 2250/407* (2013.01)

(56) References Cited

U.S. PATENT DOCUMENTS

| | | | |
|---|---|---|---|
| 2008/0187789 A1 | 8/2008 | Ghezel-Ayagh | |
| 2011/0223500 A1* | 9/2011 | Uematsu | H01M 8/04014 429/415 |

FOREIGN PATENT DOCUMENTS

| | | |
|---|---|---|
| EP | 1804322 A1 | 7/2007 |
| WO | 2008/063224 A2 | 5/2008 |
| WO | 2010/139724 A1 | 12/2010 |
| WO | 2011/077224 A1 | 6/2011 |

OTHER PUBLICATIONS

Oh et al., "Performance analysis on various system layouts for the combination of an ambient pressure molten carbonate fuel cell and a gas turbine", Journal of Power Sources, vol. 158, Jul. 14, 2006, p. 455-463.

Watanabe et al., "Applicability of molten carbonate fuel cells to various fuels", Journal of Power Sources, vol. No. 160, Issue No. 2, pp. 868-871, on Oct. 6, 2006.

* cited by examiner

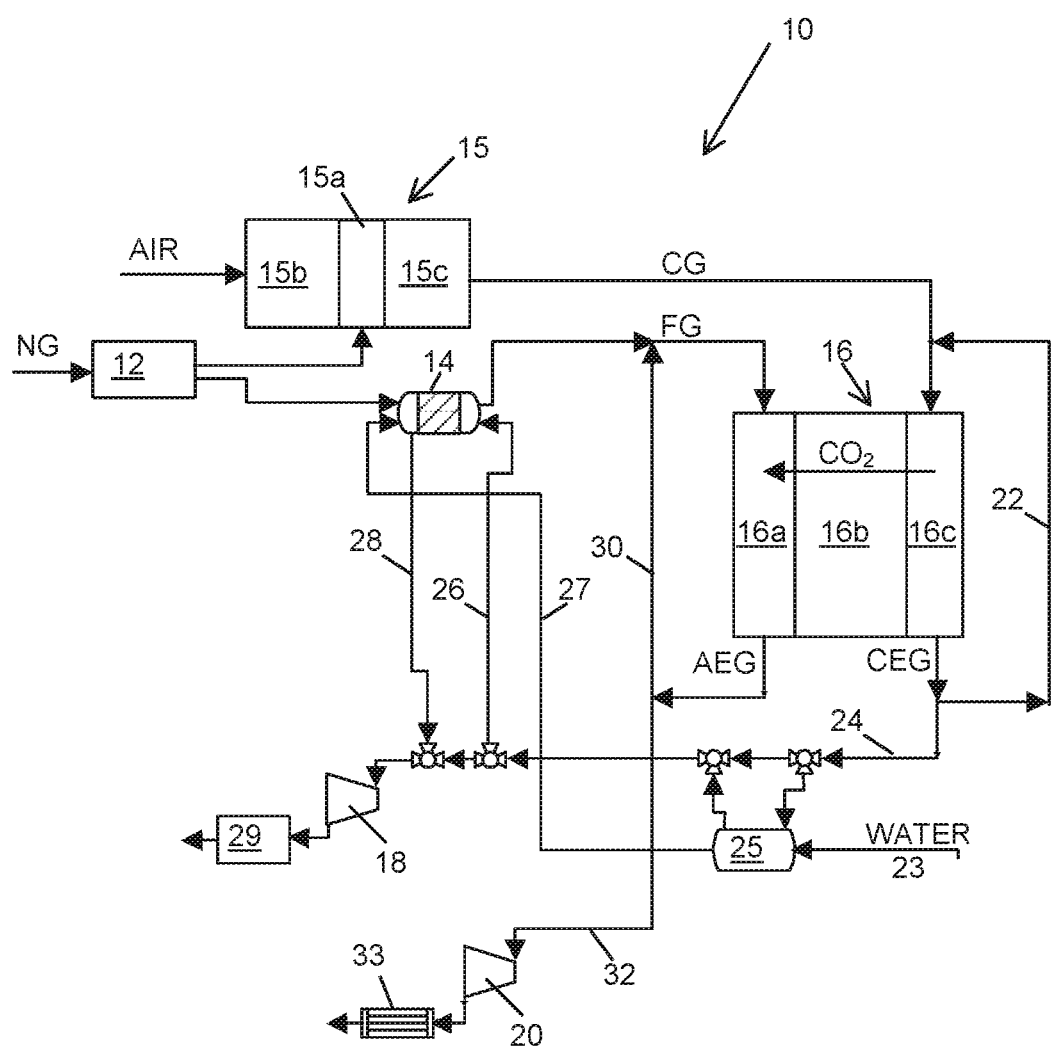

FOSSIL FUEL POWER PLANT WITH INTEGRATED CARBON SEPARATION FACILITY

CROSS-REFERENCE TO RELATED APPLICATIONS

This application claims priority to and is a division of pending U.S. application Ser. No. 14/087,507, filed on Nov. 22, 2013, which claims priority to and is a continuation application of International Application No. PCT/EP2012/058990 filed May 15, 2012, which claims priority to Great Britain Application No. 1108616.2 filed May 23, 2011, each of which is incorporated herein in its entirety by reference.

TECHNICAL FIELD

This patent specification relates to fossil-fuelled power plants with integrated carbon capture facilities. In particular, there is disclosed a system and method of operation in which a fossil-fuelled open- or combined-cycle gas turbine plant is integrated with a molten carbonate fuel cell (MCFC) arrangement.

BACKGROUND

MCFCs are under development for natural gas and coal-based power plants. MCFCs operate at temperatures in excess of 600 deg. C., using an electrolyte comprising molten carbonate salts in a permeable, chemically inert ceramic matrix, such as beta-alumina. They are more efficient at power conversion than some other fuel cells—with capture and use of waste heat, overall fuel efficiencies of MCFCs can reach 85 percent. A further advantage is that because of their high operating temperatures, they can reform fuels such as natural gas to hydrogen internally, thereby potentially eliminating the need for an external reformer. Moreover, MCFCs are resistant to poisoning by carbon monoxide or carbon dioxide, so facilitating their integration with fossil fuel power plants. In particular, MCFCs can be used to increase the efficiency of fossil fuel power plants by reacting exhaust gases to generate electricity, and
reduce environmental impact by separating out carbon dioxide from the exhaust gases.

For example, U.S. Pat. No. 7,396,603 B2 discloses a fossil fuel power plant arranged in tandem with a MCFC, in which flue gases containing about 10% $CO_2$ together with 19% water and 9% oxygen are fed directly to the cathode side of the MCFC. At the same time, fuel such as natural gas is input to the anode side, where it is reformed to liberate hydrogen. Electrochemical reactions in the MCFC effectively result in a major proportion of the CO2 in the flue gas being transferred from the cathode side to the anode side. The $CO_2$-enriched gas is then exhausted from the anode side for subsequent processing, including separation and sequestration of the $CO_2$.

Published European patent application EP 0 418 864 A2 discloses a broadly similar method and apparatus.

The present patent specification discloses a fossil fuel power plant having improved integration with an MCFC arrangement for CO2 separation, and a method of operating the power plant.

SUMMARY

A first aspect provides an operating method for a fossil fuel power plant comprising a gas turbine arrangement coupled to a molten carbonate fuel cell (MCFC) arrangement, the method including the steps of:

(i) partially expanding combustion gases in the gas turbine arrangement to a predetermined temperature and pressure substantially greater than ambient pressure and temperature and compatible with reaction in a cathode side of the MCFC arrangement; and (ii) exhausting the partially expanded combustion gases at the predetermined temperature and pressure to the cathode side of the MCFC arrangement for reaction therein.

Partial expansion of the combustion gases may be achieved by:

reducing the number of turbine stages in a gas turbine relative to the number of stages that would be present if the gas turbine was intended to expand the combustion gases down to ambient pressure, and/or expanding the combustion gases through an exhaust duct of the gas turbine whose length and profile is adapted to achieve the required partial expansion.

By only partially expanding the combustion gases in a gas turbine, instead of fully expanding the gases down to ambient pressure, the temperature and pressure of the combustion gases can be at least approximately matched to reaction conditions in the cathode side of an MCFC, thus eliminating the need to insert additional equipment such as heat exchangers, pumps or compressors between the gas turbine and the MCFC to adjust the temperature and pressure of the combustion gases to a suitable level for reaction in MCFC's. The operating method enables the provision of a less complex integrated fossil fuel power plant with fewer components and at the same time allows more effective operation of MCFC's.

Step (i) typically comprises partially expanding the combustion gases to a predetermined optimum pressure, greater than ambient pressure, at which the temperature of the partially expanded combustion gases is optimised for reaction in the cathode side of an MCFC. The temperature of the exhaust gases at the predetermined optimum pressure may be equal, or substantially equal, to the optimal cathode inlet temperature of the cathode side. Partial expansion of the combustion gases to a pressure greater than ambient pressure enables efficient operation of MCFC's under pressurised conditions.

The method may include recirculating a proportion of the cathode exhaust gases from an outlet of the cathode side of an MCFC to an inlet of the cathode side for reaction therein. Such partial recirculation is intended to improve the efficiency of the integrated fossil fuel power plant. The method may include mixing the recirculated cathode exhaust gases with the partially expanded temperature-optimised combustion gases provided by step (i) and feeding the mixture to the cathode side for reaction therein. This may enable the temperature of the partially expanded combustion gases provided by step (i) to be further adjusted for reaction in the cathode side.

The method may further include expanding through a gas expander the cathode exhaust gases that are not recirculated to the cathode inlet. This is possible because the combustion gases are only partially expanded, and not fully expanded to atmospheric pressure, prior to being fed to the cathode side of the carbonate fuel cell. Further useful work can, thus, be extracted from the non-recirculated proportion of the cathode exhaust gases by expanding them in a gas expander.

In enable the desired electrochemical reaction in the MCFC arrangement, the method includes feeding fuel gas to the anode side of the MCFC arrangement.

The method may further include recirculating a proportion of the anode exhaust gases from an outlet to an inlet of the anode side for reaction therein. Again, this partial recirculation is intended to improve the efficiency of the integrated fossil fuel power plant. The method may include mixing the recirculated anode exhaust gases with the fuel gas and feeding the mixture to the anode side of the MCFC arrangement.

The method may also include expanding through a gas expander the anode exhaust gases that have not been recirculated to the anode inlet. Again, this allows further useful work to be extracted from the non-recirculated proportion of the anode exhaust gases, thus further improving the efficiency of the integrated fossil fuel power plant.

A second aspect provides a fossil fuel power plant comprising a gas turbine arrangement and a molten carbonate fuel cell (MCFC) arrangement, the gas turbine arrangement in use being coupled to the MCFC arrangement to exhaust its combustion gases to a cathode side thereof, the gas turbine arrangement being configured to partially expand combustion gases produced by combustion of a carbon-containing fossil fuel to a predetermined pressure and temperature above ambient and compatible with reaction in the cathode side of the MCFC arrangement.

To enable the desired electrochemical reaction to proceed in the MCFC arrangement, the anode side thereof is coupled to a source of fuel gas when in use.

BRIEF DESCRIPTION OF THE DRAWING

The sole drawing is a schematic representation of an integrated fossil fuel power plant in accordance with the present disclosure.

DETAILED DESCRIPTION

Embodiments of the present disclosure will now be described by way of example only and with reference to the accompanying drawing.

The integrated fossil fuel power plant 10 includes a fuel processor 12 operable to desulphurise fossil fuel such as natural gas (NG). The power plant further includes a steam reformer 14, a gas turbine 15, a molten carbonate fuel cell (MCFC) 16 and small gas turbines 18, 20, otherwise known as gas expanders. The fuel cell 16 has an anode side 16a, a cathode side 16c and an electrolyte 16b.

The integrated fossil fuel power plant 10 is operated on natural gas (NG) by initially desulphurising it in the fuel processor 12. Of course, if the fuel fed to the power plant 10 were sufficiently pure, the fuel processor 12 would not be required. A first proportion of the desulphurised natural gas is then fed to the external natural gas steam reformer 14. As known, this creates fuel gas (FG), which is fed to the anode side 16a of the MCFC 16. A second proportion of the desulphurised natural gas is fed to a combustion section 15a of the gas turbine engine 15, which, as known, also comprises a compressor section 15b, and a turbine section 15c. The compressor operates to pressurize ambient air and pass it to the combustor 15a where it is mixed and burnt with the natural gas to produce combustion gases (CG), which are expanded through the turbine 15c. Shaft power produced by the turbine is used to drive an electrical generator (not shown) to generate electricity. The expanded combustion gases from the gas turbine 15 are fed to the cathode side 16c of the MCFC 16, where they are reacted.

In accordance with the present disclosure, the combustion gases (CG) are partially expanded in the gas turbine engine 15 to a predetermined optimum pressure greater than ambient pressure, the expansion ratio of the turbine 15c being selected so that the partially expanded combustion gases (CG) exhausted from the gas turbine 15 are at the predetermined optimum pressure. The temperature of the combustion gases varies with their pressure, according to the amount of expansion undergone in the turbine, and the predetermined optimum pressure is determined based on the optimal operating temperature of the cathode side 16c of the MCFC 16. More particularly, the temperature of the partially expanded combustion gases (CG) at the predetermined optimum pressure is equal or substantially equal to the optimal cathode inlet temperature of the cathode side 16c of the MCFC 16.

The electrochemical reaction that takes place inside the MCFC 16 causes carbon dioxide ($CO_2$) contained within the partially expanded combustion gases to be transferred from the cathode side 16c of the MCFC 16 through the electrolyte 16b to the anode side 16a. The electrochemical reaction produces electricity and the transfer of carbon dioxide to the anode side 16a produces anode exhaust gases (AEG) that are rich in carbon dioxide.

The temperature of the partially expanded combustion gases increases in the cathode side 16c of the MCFC 16 as a result of the electrochemical reaction. It can, therefore, be advantageous to recirculate a proportion of the cathode exhaust gases (CEG) back to the inlet of the cathode side 16c via a recirculation line 22, as this may enable the temperature of the partially expanded combustion gases to be further optimised for reaction in the cathode side 16c. In the illustrated embodiment, the recirculated cathode exhaust gases are mixed with the partially expanded combustion gases (CG) from the gas turbine 15 before the resulting mixture is then fed to the cathode side 16c of the MCFC 16.

The cathode exhaust gases that are not recirculated to the inlet of the cathode 16c are fed via a feed line 24 to the gas expander 18 for further expansion to generate electricity. This further expansion is possible due to the fact that the combustion gases (CG) are not fully expanded to ambient pressure in the gas turbine 15. However, in the illustrated embodiment, some of the non-recirculated cathode exhaust gases are bled off upstream of the gas expander. Firstly, some of the cathode exhaust gases (CEG) are used to raise steam in a specific heat recovery steam generator 25, before being fed back into line 24. The steam thus raised from water input 23 is fed to the external reformer 14 on feed line 27 for use in the natural gas steam reforming process. Secondly, some of the cathode exhaust gases may be bled off via a feed line 26 and passed through heat exchange passages of the reformer 14 to raise the temperature of the reactants before the cathode exhaust gases are returned to the gas expander via a feed line 28. The efficiency of the power plant 10 may be further improved by extracting further useful work from the hot gas stream exhausted from the gas expander 18, for example by passing the exhaust gases through a heat recovery steam generator 29 to produce process steam. Hence, heat requirements for the natural gas steam reforming process, and for steam generation, are both satisfied by cooling down the cathodic outlet gas. Note that a variation of the illustrated layout could comprise combining units 25 and 29 in a single heat recovery steam generator.

The power plant 10 also includes a recirculation line 30 for recirculating a proportion of the anode exhaust gases (AEG) from the anode side 16a of the MCFC 16 to the inlet of the anode side 16a. The recirculated anode exhaust gases are mixed with the fuel gas (FG) before the mixture is fed to the anode side 16a of the MCFC 16. The anode exhaust gases that are not recirculated are fed, via a feed line 32, to the gas expander 20 where they are expanded to generate electricity.

After expansion in the gas expander 20, water is removed from the anode exhaust gases in a condenser 33. The expanded anode exhaust gases are rich in carbon dioxide and hence downstream of condenser 33 can be either passed direct to $CO_2$ compression and subsequent sequestration, or the concentration of CO2 can be further increased by utilising known means such as oxy-combustion, in which the anode gases are burnt with pure oxygen, or CO2 chemical capture processes in which the gases are treated with CO2 solvents such as amines. The use of the MCFC 16 in the power plant 10 thus advantageously facilitates carbon capture and storage whilst at the same time maximising the operating efficiency of the power plant 10.

It should be understood that various modifications could be made to the embodiments described above within the scope of the appended claims. For example, the carbonate fuel cell 16 could be an internally reforming MCFC, in which case the external steam reformer 14 could be omitted. Recirculation of the exhaust gases from the anode side 16a and/or the cathode side 16c of the MCFC 16 could also be omitted.

The invention claimed is:

1. A fossil fuel power plant comprising:
a gas turbine arrangement comprising a gas turbine with a combustion section, a compressor section and a turbine section, configured to partially expand combustion gases to a predetermined pressure and temperature above ambient, coupled to a molten carbonate fuel cell arrangement for gas turbine arrangement combustion gases exhaust into a cathode side of the molten carbonate fuel cell arrangement at the predetermined pressure and temperature above ambient; and
the molten carbonate fuel cell arrangement comprising an anode, an electrolyte, and a cathode in the cathode side configured for reaction of the partially expanded, exhausted combustion gases at the predetermined pressure and temperature above ambient.

2. A fossil fuel power plant according to claim 1, wherein the reaction in the cathode side is an electrochemical reaction, which proceeds when an anode side of the molten carbonate fuel cell arrangement is coupled to a source of fuel gas.

\* \* \* \* \*